July 15, 1952     J. F. SIPIOR ET AL     2,603,301
MOTOR PROPELLED AMUSEMENT DEVICE
Filed May 8, 1948     3 Sheets-Sheet 1
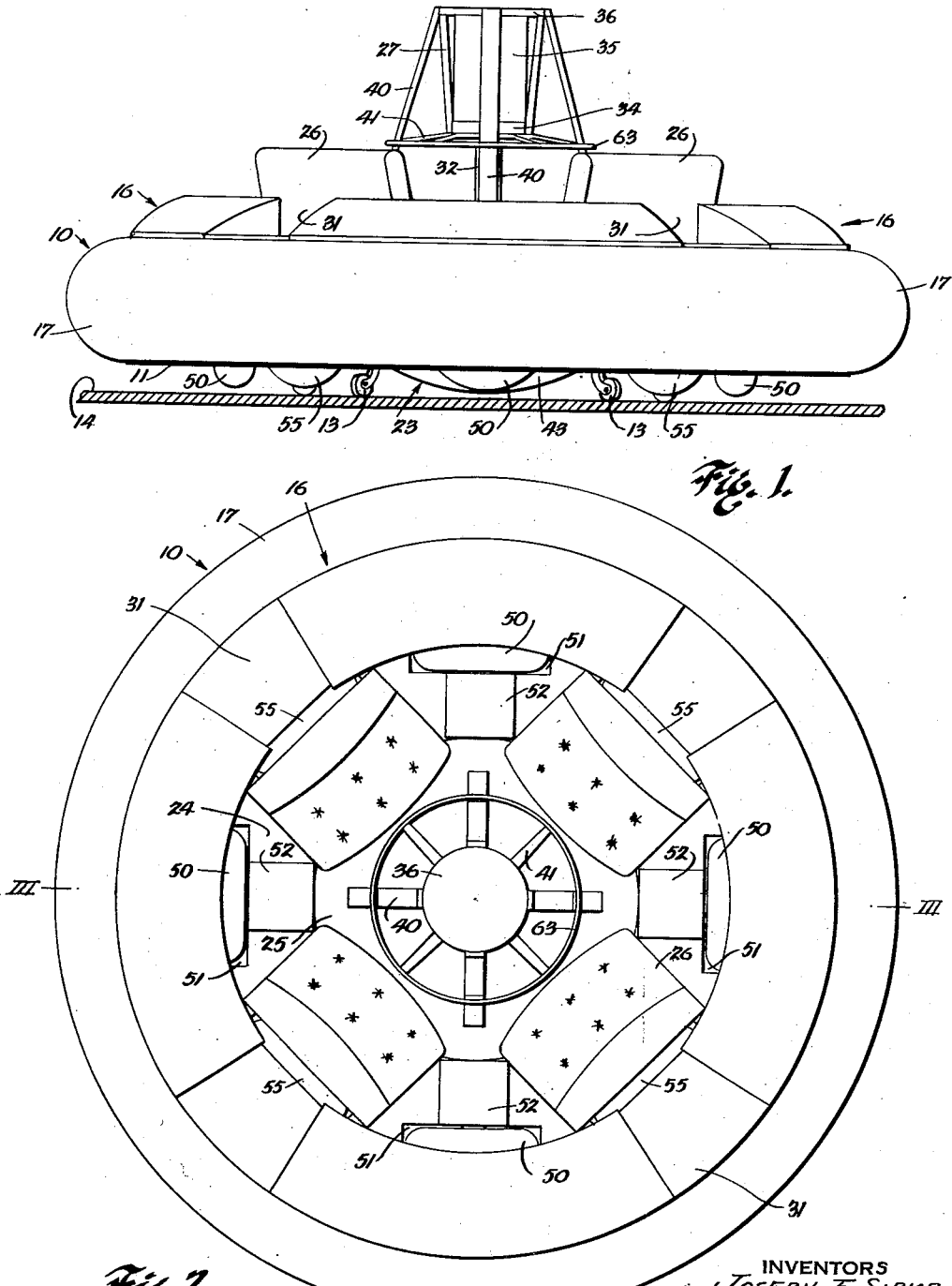
INVENTORS
JOSEPH F. SIPIOR
BY CASIMIR J. SIPIOR
Bean, Brooks, Buckley & Bean.
ATTORNEYS July 15, 1952  J. F. SIPIOR ET AL  2,603,301
MOTOR PROPELLED AMUSEMENT DEVICE
Filed May 8, 1948  3 Sheets-Sheet 2
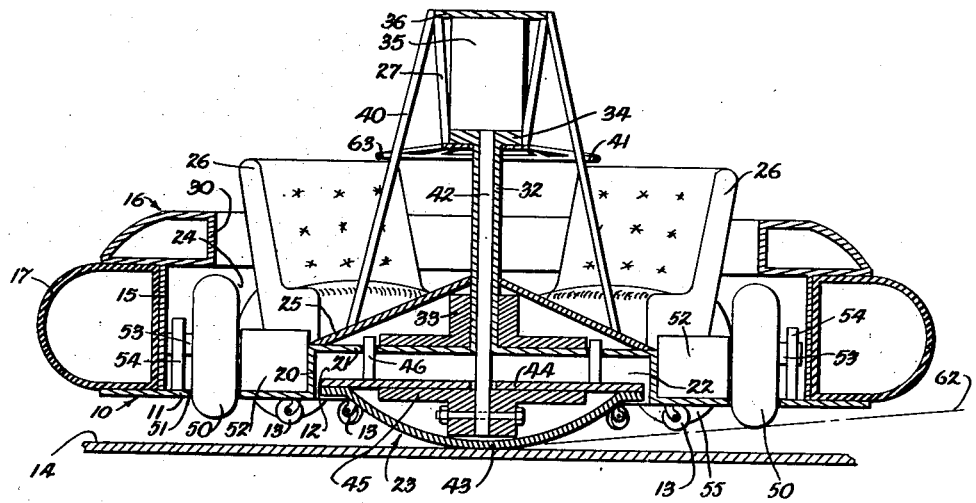
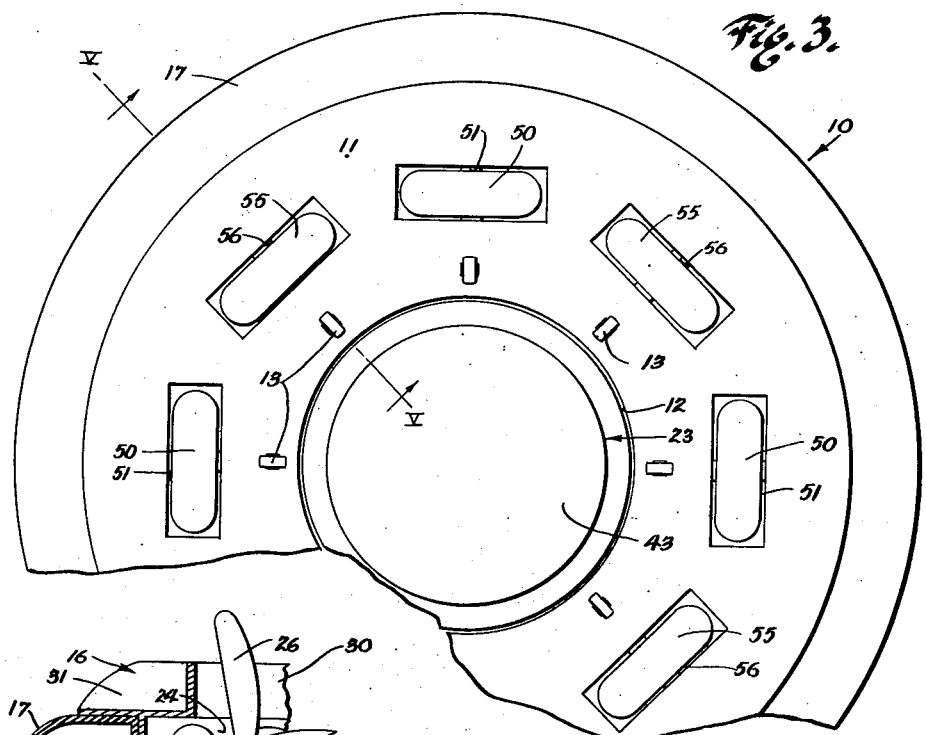
INVENTORS
JOSEPH F. SIPIOR
CASIMIR J. SIPIOR
BY
Beau, Brooks, Buckley & Beau.
ATTORNEYS July 15, 1952  J. F. SIPIOR ET AL  2,603,301

MOTOR PROPELLED AMUSEMENT DEVICE

Filed May 8, 1948  3 Sheets-Sheet 3

INVENTORS
JOSEPH F. SIPIOR
and CASIMIR J. SIPIOR
BY Bean, Brooks, Buckley & Bean
ATTORNEYS.

UNITED STATES PATENT OFFICE 2,603,301

MOTOR PROPELLED AMUSEMENT DEVICE

Joseph F. Sipior and Casimir J. Sipior, North Tonawanda, N. Y.; said Casimir J. Sipior assignor to said Joseph F. Sipior Application May 8, 1948, Serial No. 25,973

7 Claims. (Cl. 180—7)

Our invention relates in general to amusement devices, and in particular or an amusement car movable over the substantially flat surface of a floor of an arena.

The principal object of our invention is to provide an amusement car capable of being tilted at random by the passengers occupying the same to provide a thrilling and exciting ride.

A further object is to provide a car having a pivot unit formed with a lower convex member for supporting the car in tiltable manner, whereby the pivotal point around which the car may rotate will change according to the amount of tilt thereof.

Another object is to provide a car with suitable power means operable to give to it rotative and transmission impulses when in tilted positions.

A further object is to provide means for rotating the pivot unit relative to the car body.

Another object is to provide a car having a plurality of power wheels arranged for intermittent driving contact with the floor of the arena at random and only when the car is in tilted positions.

A further object is to provide a car having a convex supporting bottom projectable at will to body-supporting and tiltable position.

Moreover, our car is provided with a plurality of idler wheels near its periphery to limit the tilting movement thereof.

Furthermore, an annular buffer is arranged on the periphery of the body of the car to lessen the shock of impact with the retaining wall of an arena or an adjacent car.

The above objects and advantages have been accomplished by the device shown in the accompanying drawings, of which:

Fig. 1 is an elevational view of our car;

Fig. 2 is a plan view thereof;

Fig. 3 is a vertical sectional elevation taken on line III—III of Fig. 2;

Fig. 4 is a bottom plan view of our invention;

Fig. 5 is a sectional view taken on line V—V of Fig. 4.

Figure 7:
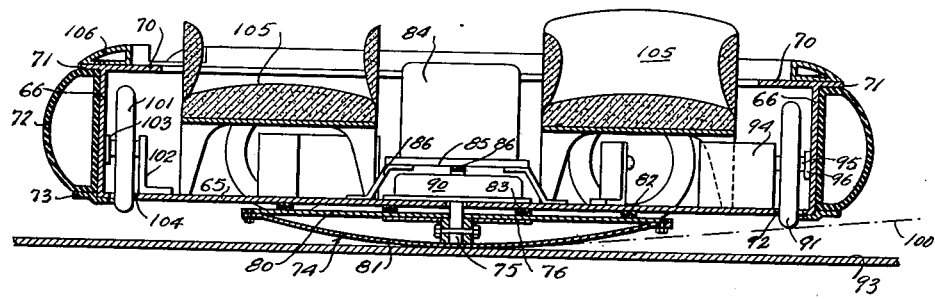
Fig. 7 is a vertical sectional view of the car shown in Fig. 6 taken on line VII—VII of that figure.

Referring now to the form of invention shown in Figs. 1 to 5, inclusive, our device comprises an amusement car having a circular body 10 provided with a substantially flat car bottom 11 in which is formed a centrally arranged opening 12 which will be hereinafter described. The car is mounted upon suitable swivel casters 13 carried by the car bottom 11 and which engage the floor 14 of the arena (not shown) within which the car is designed to operate. The casters 13 serve to support the car when in its non-tilting position, in which position it is in a state of equilibrium and ready to receive and discharge passengers.

The body 10 is preferably provided with a cylindrical wall 15 and with a hollow ring member 16 extended across the top and overhanging both sides thereof. A buffer 17, preferably of resilient nature such as an inflated tube of rubber, is mounted on the outside of the wall, and it extends beneath the outwardly extending portion of the ring member beyond the outer periphery thereof, whereby it will contact with the retaining wall (not shown) of the arena or an adjacent car so as to lessen the shock of impact therewith. Obviously, instead of inflated rubber, the buffer may be made solid and of any suitable resilient material.

Extending upwardly from the car bottom 11 and surrounding the recess 12 is a bottom ring 20 at the top of which is secured an auxiliary bottom 21, thereby providing a recess 22 for the reception of a pivot unit 23 when in its inactive position.

The cylindrical or annular wall 15 of the body 10 provides a centrally arranged pit 24 having a pit bottom 25 inclined upwardly and extending from the bottom ring 20 to the center of the car, which serves not only to provide a foot rest for the passengers but also to conceal and enclose some of the working parts of the car. A number of seats 26 are provided around in the pit 24, preferably four in number so that the passengers will occupy positions opposite each other. The inner wall 30 of the ring member overhangs the wall 15 extending inwardly therefrom, whereby the passengers are protected from the working parts of the car. Arranged preferably opposite each of the seats is a step well 31 formed by cutaway portions of the ring member, thus providing convenient means of access to the pit.

Supported centrally and extending up through the pit 24 is a tubular shaft column 32, the lower end of which is secured to the auxiliary car bottom 21 by means of an upper flange member 33. At the upper end of the tube is a supporting plate 34 which serves to support a hydraulic cylinder 35. The cylinder is secured at its upper end to an upper plate 36 to which a plurality of braces 40 are attached. These braces extend downwardly from the plate to the pit bottom 25 where they are securely fastened. Braces 27 are also provided for connecting together the plates 34 and 36. The lower plate 34 is furthermore supported by means of a supporting spider 41 which serves to connect the braces 40 to the plate and to the upper end of the tubular column 32. A shaft 42 is slidably mounted within the tubular column 32, and is attached to the plunger of piston (not shown) of the hydraulic cylinder 35, so as to be actuated thereby when fluid is conducted to the cylinder by any suitable means (not shown). The cylinder 35 may be actuated by any suitable fluid under pressure. Suitable control means (not shown) will be provided and located at some place convenient to the operator or to one of the passengers. In order to supply pressure to the medium used in the cylinder, a suitable compressor (not shown) may be provided and be driven by one of the power units 52 or by separate means (not shown). Since the specific details of the cylinder 35, the control thereof, and the compressor means are all standard articles of manufacture, and do not, therefore, form a part of our invention, they are not shown or described in detail.

Attached to the lower end of the shaft 42 and mounted normally within the recess 22 is the pivot unit 23 of our device. This pivot unit is provided with a spherically-shaped convex lower disc member 43, and an upper disc member 44 which are suitably secured together at their peripheral edges. A flange member 45 is secured to the bottom of the upper disc member 44 and provides means for connecting the shaft to the pivot unit. So as to prevent relative rotation of the pivotal unit with the car, the disc member 44 carries a plurality of upstanding pins 46 which engage suitable apertures formed in the auxiliary bottom 21. These pins are loosely engaged within the aperture so that relative axial movement therein will be permitted.

Carried by the car is a plurality of power wheels 50, equidistantly spaced around the car bottom 11 and having their lower peripheries projecting through slots 51 formed in the bottom. Each of these power wheels is driven by a power unit 52 of any suitable type thereby causing the wheel to be constantly rotated during the operation of the car. Each of these wheels is preferably mounted upon the shaft 53 of its power unit and it is supported at its outer end by means of a bearing 54. Idler wheels 55 are carried by the bottom 11 of the car and one of these wheels is peripherally spaced between each pair of power wheels 50. Each idler wheel has its lower periphery passing through a slot 56 formed in the car bottom 11 and its shaft 60 is supported in suitable bearings 61 mounted upon the car bottom 11. Each of the power wheels 50 and idler wheels 55 is preferably provided with a pneumatic tire which serves to cushion the impactive force when either wheel strikes the floor of the arena, and which furnishes the necessary traction for the power wheels when contacting the floor.

As shown in the drawings, the power wheels 50 and the idler wheels 55 are so positioned that their lower peripheries lie in a plane which is slightly above the plane of the supporting surface 14 when the car is being supported by the casters 13. When, however, the pivotal unit 23 is moved downwardly to its active position, as shown in Fig. 3, the car will be raised off the casters and may then be rocked by any of the passengers of the car so as to tilt it to one side or to the other. When so tilted, the car will occupy a position with relation to the floor 14 which is indicated by the broken line 62 in which position the power wheels and idler wheels will be brought in contact with the floor.

As hereinbefore stated, the hydraulic cylinder is operated by any well known means and may be controlled either by one of the passengers of the car or by an attendant. After being actuated to its lower position, the pivot unit will remain in such position while the car is being operated. When the ride is completed, the pivotal member is allowed to move upwardly within the recess 22, whereby the car will be lowered to a position where the casters 13 will contact the floor and support the car in non-tilting manner, whereupon the passengers may leave or enter the car while it is in the state of equilibrium and at a convenient elevation. When the car is being raised and supported by the pivot unit, any unbalanced condition caused by a difference in weight of opposite passengers will cause the car to tilt. Such tilting may also be caused by a passenger as he throws his weight against the back of the seat. Any tilting action of the car will cause one of the power wheels to be brought into contact with the floor 14 of the arena and thereby give to the car a rotative impulse. When either of the rotating power wheels 50 is brought into contact with the floor 14, one of the idler wheels 55 on either side of the active power wheel will also contact the surface, thereby controlling the tilting movement of the car and preventing a second power wheel from becoming actively engaged with the floor. When the car is being moved from its upright position to a tilted position, it is obvious that the point of pivotal contact of the lower convex member 43 of the pivot unit with the floor 14 will move from the center of the car to a position which is eccentric thereto, thereby causing the high side of the car to move at a more rapid rate of travel than the lower side thereof, thereby providing a thrilling exciting experience to the passengers of the car. During its operation, the car may be tilted back and forth in any one of a number of random positions, thereby giving to all of the passengers substantially the same experience. The power wheels may be so driven as to rotate in the same direction, or if desired, alternate wheels may be rotated in opposite directions, thereby adding to the thrill and excitement of the ride. In order that the passengers may steady themselves upon the seats, a hand rail 63 is provided which is preferably secured to the braces 40 and is within convenient reach of the passengers occupying the seats 26.

Figure 6:
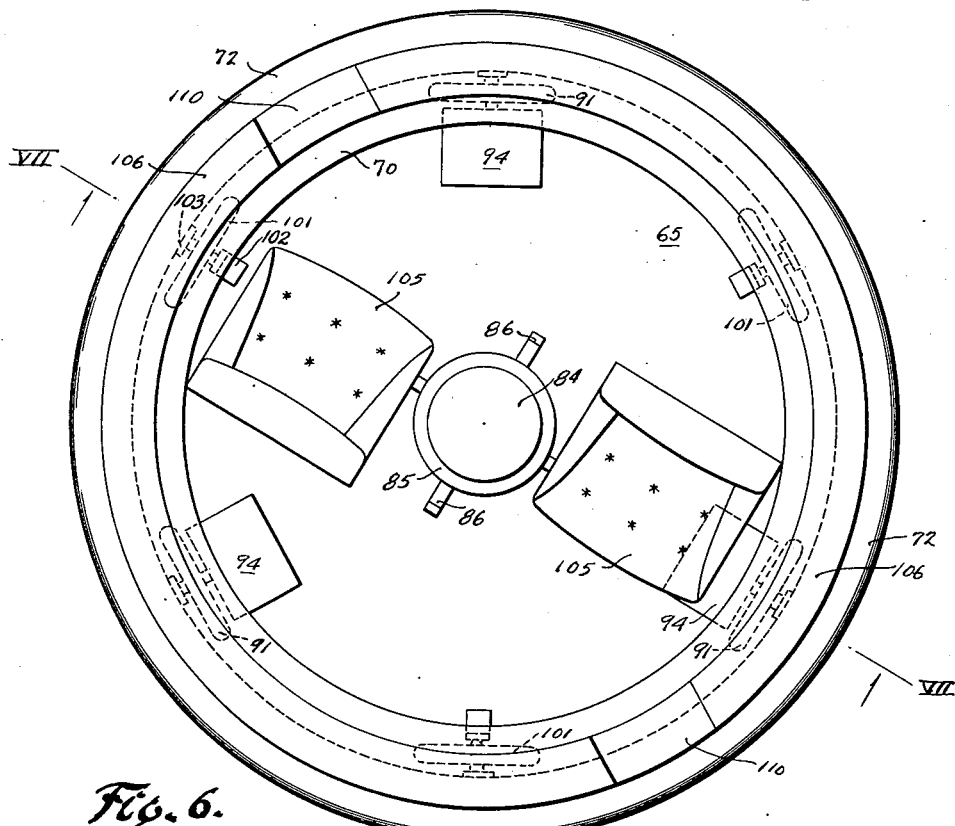
Fig. 6 is a plan view of a modified form of our invention.

Referring now to the form of invention shown in Figs. 6 and 7, our car comprises a bottom 65 from which rises a circular outer wall 66. The wall 66 is provided with an inwardly extending flange 70 which projects over and protects the moving parts of the device, to be hereinafter described. An outwardly extending flange 71 is provided at the upper edge of the wall, and a buffer 72 is disposed around the outer surface of the wall 66, having its upper edge bearing against the projecting flange 71. A demountable plate 73 is secured to the bottom 65 and extends outwardly beyond the wall 66 thereby serving to contact with and hold the buffer in place. The buffer, as in the other form of the invention, is preferably made in the form of a closed annular ring of rubber or like resilient material which is inflated with air under pressure to give it the desired cushioning action. The exterior shape of the buffer is preferably such that when two cars are in an arena at the same time, the high side of one car will be prevented from riding upon the low side of the adjacent car.

In this form of our invention, the car is supported by means of the pivot unit 74 which is rotatably mounted at the center of the car and is carried by a shaft 75. A flange 76 secured to the lower end of the shaft by suitable means serves to connect the shaft to the upper disc member 80 of the unit. The lower disc member 81 of this form of device is also convex, but is preferably struck from a greater radius than that of the disc member of the other form of the device. Thrust ball bearings 82 and 83 are disposed between the upper disc member 80 and the bottom 65 of the car, thereby taking the thrust produced by the weight of the car and its passengers and providing antifriction bearings between the car and the unit.

The pivot unit 74 is driven by a disc unit 84 which is carried upon a suitable platform 85 supported preferably in spaced relation to the bottom 65 of the car by means of a plurality of braces 86. In the space thus provided between the platform 85 and the bottom 65, we place the power transmission unit 90 of our device. This unit is preferably of the fluid drive type, and suitable control means (not shown) are provided for transmitting power from the unit motor to the pivot unit.

In this form of the device when the pivot unit is rotating and the car is substantially uniformly balanced the pivot point of the pivot unit will be substantially coaxial with the shaft 75 of the unit, and the disc will rotate about this point without giving to the car any motion except that of a slight rotative tendency. When, however, the car is tilted the point of support of the revolving pivot unit is immediately shifted from the center of the lower convex disc member to a point removed therefrom a distance equal to the amount of tilt. Obviously, when the car is supported by the revolving disc at a point off-center, it will cause the car to be propelled forward in the direction of rotation thereof and in a path of somewhat looped or involute shape. While the rotating pivot unit 74 of this form of invention will give to the car a rotary movement as well as causing it to be propelled from one place to another, the thrill of the ride will be greatly increased by the provision of a plurality of power driven wheels 91. Each of these wheels is projected through a slot 92 formed in the bottom 65 of the car and extends beyond the lower surface thereof to a point where they will contact with the floor 93 of the arena under certain conditions of car tilt. When either of the wheels 91 comes into contact with the floor, it will give to the car a spinning impulse which will tend to rotate the car about its point of support as it travels along in an irregular path. Since, when in this position, the high side of the car will be moving at a much more rapid rate of travel than the lower side thereof, the thrill and excitement of the ride will be greatly enhanced. Each of these wheels is connected to and driven by a power unit 94 which is supported by the bottom 65 of the car. The shaft 95 of the power unit preferably extends beyond the wheel and is rotatably supported in a suitable bearing 96 secured to the outer wall 66 of the car. When the car is tilted so that the wheels will contact the floor, it will have assumed the position shown by the dot and dash line 100 of Fig. 7. So as to limit the tilting movement of the car, we preferably provide idler wheels 101, one of such wheels being located between each two adjacent power wheels 91. Each of these wheels is rotatably supported by a bracket 102 carried by the bottom of the car and by a bearing 103 secured to the wall 66 thereof. Each of these wheels are projected downwardly through a slot 104 formed in the car bottom so that their lower peripheries may be brought into contact with the floor of the arena.

Seats 105, preferably two in number, are arranged within the cockpit of the car and so placed as to face in opposite directions and to be on opposite sides of the center of the car. A hollow annular ring member 106 is arranged about the outer periphery of the car and is secured to the top of the flanges 70 and 71. Step wells 110 are provided at convenient points in the periphery of this ring to permit easy access of passengers to the cockpit of the car.

While we have shown our invention as applied to a single car, it is obvious that a number of them will be employed upon the floor of the same arena, which in the course of the ride, will be brought into interference with one another, thereby greatly increasing the thrill and enjoyment of the ride. Furthermore, while we have shown the car provided with three and four power wheels and with a like number of interspaced idler wheels, it will be obvious that the number of power wheels and idler wheels is immaterial, it being necessary only that a sufficient number of them be employed to prevent the periphery of the car from contacting with the floor of the arena.

We have for convenience described our invention as applied to a single car, but when in use upon the arena which is provided with a retaining wall (not shown), there will preferably be a number of independently operated cars which in the course of the ride will be brought into interference with one another thereby greatly increasing the thrill and enjoyment of the ride. Obviously, some modifications of the details herein shown and described may be made without departing from the spirit of our invention or the scope of the appended claims; and we do not, therefore, wish to be limited to the specific details herein shown and described, the forms shown being merely preferred embodiments of our invention.

What is claimed is:

1. An amusement device comprising a rotatable pivot member having a circular base with an upstanding drive shaft fixed coaxially thereon, the under face of the base being rounded for universal rocking upon a floor surface, a passenger-carrying body supported on the base for rocking movement therewith as a unit and journaled on the drive shaft for rotation relative to the drive shaft about the axis thereof, and a power drive on the body operatively connected to the drive shaft for rotating the base, the device being normally balanced to dispose the drive shaft substantially normal to the floor surface.

2. An amusement device comprising a rotatable pivot member having a circular base with an upstanding drive shaft fixed coaxially thereon and arranged normal thereto, the under face of the base being rounded for universal rocking upon a floor surface, a passenger-carrying body supported on the base for rocking movement therewith as a unit and journaled on the drive shaft for rotation relative to the drive shaft about the axis thereof, a power drive on the body operatively connected to the drive shaft for rotating the base, and seats carried by the body and arranged symmetrically about the drive shaft to normally balance the base and to enable the passengers occupying the seats to unbalance the base and to change the point of pivotal contact of the pivot member with the floor surface and to thereby provide various movements of the device over the floor surface.

3. An amusement device comprising a rotatable pivot member having a circular base with an upstanding drive shaft fixed coaxially thereon, the under face of the base being rounded for universal rocking upon a floor surface, a passenger-carrying body supported on the base for rocking movement therewith as a unit and journaled on the drive shaft for rotation about said drive shaft, a power drive on the body operatively connected to the drive shaft for rotating the base, and power wheels carried by the body and adapted to be in constant operation during the use of the device and said power wheels being brought into contact with the floor surface only when the body is in tilted position to impart thereto accelerated rotative movement.

4. An amusement device comprising a rotatable pivot member having a circular base with an upstanding drive shaft fixed coaxially thereon, the member being of spherical-segment shape having its convex surface facing downwardly for universal rocking upon a floor surface, a passenger-carrying body supported by the base and tiltable with said base for rocking movement therewith as a unit and journaled on the drive shaft for rotation relative to the drive shaft about the axis thereof, and a power drive on the body operatively connected to the drive shaft for rotating the base.

5. An amusement device comprising a rotatable pivot member having a circular base with an upstanding drive shaft fixed coaxially thereon, the under face of the base being rounded for universal rocking upon a floor surface, a passenger-carrying body supported on the base for rocking movement therewith as a unit and journaled on said pivot member for rotation relative to the drive shaft about the axis of the drive shaft, a power drive on the body operatively connected to the drive shaft for rotating the base, and means on the body operable to limit the tilt of the device.

6. An amusement device comprising a rotatable pivot member having a circular base with an upstanding drive shaft fixed coaxially thereon, the under face of the base being rounded for universal rocking upon a floor surface, a passenger-carrying body supported on the base for rocking movement therewith as a unit and journaled on the drive shaft for rotation relative to the drive shaft about the axis thereof, a power drive on the body operatively connected to the drive shaft for rotating the base, power wheels carried by the body and adapted to be in constant operation during the use of the device, said power wheels being brought into contact with the floor surface only when the body is in tilted position to impart thereto accelerated rotative movement, and means on the body operable to limit the tilt of the device.

7. An amusement device adapted to travel over a substantially flat floor surface, comprising a rotatable passenger-carrying body member, a rotary propelling member supporting the body member for rocking therewith as a unit, shaft means rotatably connecting the body member and the propelling member for relative rotation about a common axis, said propelling member having a substantially spherical driving under-surface in axially fixed relation to said common axis and supporting the unit for universal rocking contact with the floor surface, the point of rocking contact of said under-surface being substantially coaxial with the common axis, when the latter is normal to the floor surface in a unit-balanced position, to arrest progress of the unit over the floor surface by permitting the propelling member to spin idly thereon, said driving under-surface having annular driving portions concentric with said common axis for successive driving contact with the floor surface during such rocking action of the unit thereon to impart floor-traversing movement to the unit over the floor surface at speeds varying in accordance with the tilt of the unit, and power means carried by one of said members and operatively connected by said shaft means to the other member for causing relative rotation of the propelling member about said common axis to so propel the unit over the supporting surface.

JOSEPH F. SIPIOR.
CASIMIR J. SIPIOR.

REFERENCES CITED

The following references are of record in the file of this patent:

UNITED STATES PATENTS

| Number | Name | Date |
|---|---|---|
| 1,073,970 | Ernst | Sept. 23, 1913 |
| 1,150,245 | Bramkamp | Aug. 17, 1915 |
| 1,534,978 | De Waltoff et al. | Apr. 21, 1925 |
| 1,656,637 | Hudson | Jan. 17, 1928 |
| 1,669,104 | Stock | May 8, 1928 |
| 2,009,904 | Purves | July 30, 1935 |
| 2,267,254 | Reilley | Dec. 23, 1941 |
| 2,398,541 | Leach | Apr. 16, 1946 |

FOREIGN PATENTS

| Number | Country | Date |
|---|---|---|
| 401,214 | Germany | Sept. 2, 1924 |